Dec. 10, 1940.    F. A. BARNES    2,224,627
BEARING
Filed April 19, 1939

Inventor
FREDERICK A. BARNES
By Raymond N. Junkins
Attorney

Patented Dec. 10, 1940

2,224,627

UNITED STATES PATENT OFFICE 2,224,627

BEARING

Frederick A. Barnes, Cleveland Heights, Ohio, assignor to Bailey Meter Company, a corporation of Delaware Application April 19, 1939, Serial No. 268,770

6 Claims. (Cl. 308—135)

This invention relates to a blind thrust bearing assembly, particularly adapted for use in meters, pressure gages, and the like; where the fluid pressure within the casing, in the wall of which the bearing is formed, is greater or less than that of the atmosphere and where the operating devices are inside of fluidtight casings, necessitating the passage of shafts, spindles or equivalent translating devices through the walls of the casings.

The pressure differentials available for imparting motion to a spindle in most cases are very small as compared to the pressure within the casing, against which it is necessary to seal. However, in providing such seal it is extremely essential that friction or any hampering or opposition of movement to the spindle be avoided or reduced to a minimum. Ordinary types of stuffing glands or cup leather packing are objectionable because of the friction they produce when tightened or, as in the case of cup leathers, pressure itself acts upon the cup to keep the bearing tight.

Present day problems demand that metering or measuring of pressures or differential pressures, where the static pressure within the meter casing be from eight hundred to three thousand pounds per square inch, maintain a pressuretight bearing, yet one having a minimum of frictional resistance to the movement of a spindle extending therethrough.

To prevent end thrust it has been common in the past to have each end of the spindle extend through a pressuretight bearing, to the atmosphere, but usually only one end of the spindle is made use of for transmitting motion to a recording pen, indicator, or the like. However, with the best of designs the total friction introduced by the two bearings will be twice that of a single bearing. A single bearing through which the spindle extension may pass, could be used, with consequent elimination of the friction of one such bearing, if the opposite end of the spindle is received in a blind bearing but here a serious end thrust is experienced in the direction of the open bearing with consequent increase of friction and inaccuracy of transmission of motion.

It is an object of my invention therefore to provide a bearing having negligible resistance, of a blind construction, and one that is adapted to take up whatever thrust may be placed upon the spindle.

It is a further object to provide a combination washer and thrust taking bearing assembly.

These and other objects will be readily discernible from the attached illustrations and description thereof. I illustrate and describe, as a preferred embodiment, the use of a pressuretight blind thrust bearing in connection with a fluid rate of flow meter having a casing within which the fluid meter parts are subjected to a static pressure which may approach the order of three thousand pounds per square inch, and which are positioned by pressure differentials of 100 inches of water or less, for imparting angular motion to a spindle extending through the wall casing and which carries exteriorly an indicating pointer or a recording pen, the other end of the spindle being in the blind thrust bearing assembly.

Figure 1:
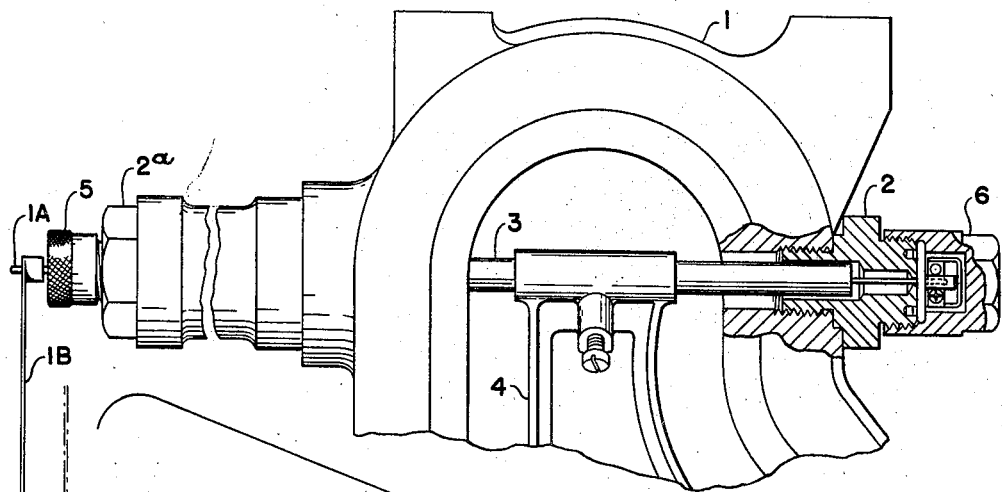
Fig. 1 is a plan view, partially in section, of a part of a fluid meter embodying the invention.

In Fig. 1 I show one end 1A of a spindle 3 protruding through a pressure casing 1 to the atmosphere and the other end enclosed in a bearing housing 2A which is separable from the case but fitted and threaded into it. The end 1A desirably carries a recording pen 1B, or an indicating pointer, or otherwise uses the angular positioning of the spindle 3 to advise the value of pressure or other measurement effective within the casing 1 and which it is desired to transmit through the wall of the casing 1 without loss of pressure. A construction of this type is unbalanced and an end thrust will result, usually toward the open end. Such end thrust must be avoided for it would create additional and undesirable friction by forcing the spindle shoulders to rub against the bearing housing. Through my construction I prevent any end play of the spindle or may limit it to any desirable amount. However, the great advantage that is derived from this particular construction is the avoidance of one open bearing and its consequent friction. By the elimination of one of two open bearings I cut friction almost in half.

In my illustration, I have shown the invention as applied to a differential pressure gage, or flow meter, a portion of which is shown as in the form of a chamber 1, into the sidewalls of which are screw-threaded bearing supports or bodies 2, each externally threaded at its projecting end. An angularly moved spindle 3, whose total travel, for example, may be forty degrees, and which is actuated within the chamber by a means of any suitable pressure receiving device, as through the medium of an arm or bifurcated lever 4, extends in opposite direction through the supporting bodies 2, wherein the openings are slightly larger than the spindle diameter.

The fully protruding end 1A of spindle 3 moves in a pressure tight bearing of the type described in my Patent 2,042,166, not generally shown here but contained in cap follower 5 and consisting essentially of a flat piece of pliable material having sufficient stiffness when compressed to act as a bearing. This material rests in a metallic recessed disc adapted, upon pressure applied thereto, as through cap 5 to cause the pliable material to cold flow into all parts of the disc follower and about the spindle, thus preventing any contact of the spindle with the supporting body—and furnishing a pressure tight bearing. It is understood however that this type of front bearing is a preferred illustration only and that my invention may be used with a variety of others.

In a similar bearing body 2 at the rear of the casing 1, I provide a bearing for the protruding spindle. The bearing is a part of the body 2 and has a bearing surface of sufficient area to allow free and unrestricted movement therein of the spindle. The protruding end of the spindle 3 is clamped by a clamping means held by a freely moving yoke, this yoke being external of another and the entire assembly enclosed by cap follower 6.

Figure 2:
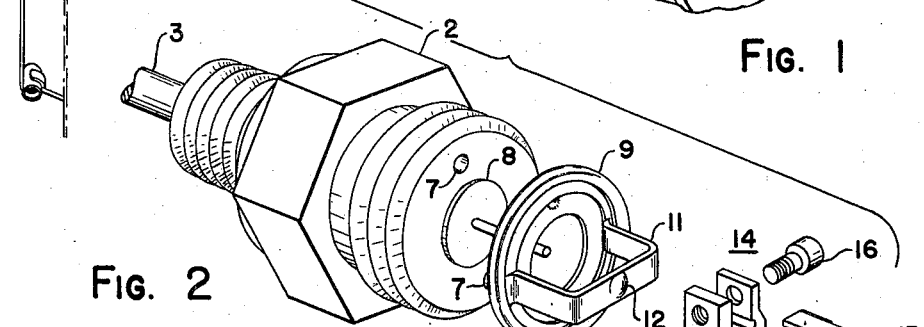
Fig. 2 is an exploded perspective view of my invention showing the co-relation of the various parts.

I shall now describe, with specific detail and reference to Fig. 2 my combination washer and thrust taking assembly. In the external face of the bearing body 2 through which spindle 3 protrudes, are holes 7, oppositely placed on either side of the raised aligning portion 8 about which the washer 9 snugly fits, adapted to receive the extensions 10 (Fig. 4) of the base of the washer 9 in order to prevent its rotation or any altering of its position when cap follower 6 is drawn tightly against it. Attached to the washer 9 and across its diameter is a raised rectangular yoke 11 having at its center and opposite the protruding spindle end, an outward indentation 12, as a nipple. Across the yoke 11 fits another yoke 13, having a clamping means generally shown at 14, the entire assembly of yoke and clamping means disassembled (in Fig. 2). The clamping parts 15 are grooved midway and inside to receive the protruding spindle end, and fit into the retaining inwardly projecting extension 17 of the yoke 13, thence are drawn and held together by the studs 16. When completely assembled the yoke 13 straddles yoke 11, the clamping means 14 are inside yoke 11 and firmly holding the end of spindle 3 (see Fig. 4).

Figures 3, 4:
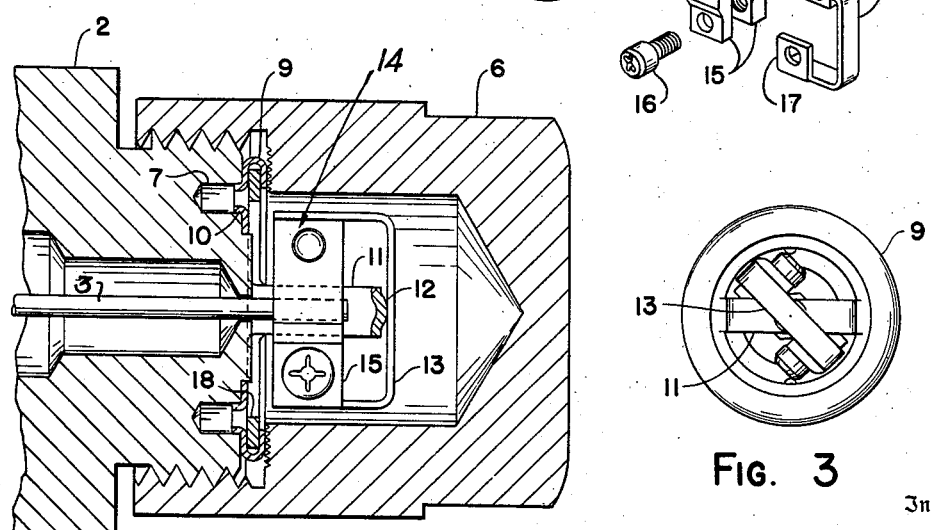
Fig. 3 is a plan view of my invention.
Fig. 4 is an enlargement of the partially cut section of Fig. 1.

A plan view of the combined assembly is shown in Fig. 3 wherein I show the positions of yokes 11, 13.

In the enlarged illustration of Fig. 4 I show the thrust bearing washer assembly in position. I also show a cross-section of the washer 9 which with its built-in yoke 11, is in this particular example, of special construction. The washer consists of two pieces, a flat circular inner piece 18, whose center has been forced out and sides cut away to form the yoke 11, and an outer covering thereof 9. In pressing 9 about filler 18, two holes are punched therethrough forming projections 10, which fit into recesses 7. This washer and yoke assembly is relatively cheap to produce as it is pressed in two operations out of a ductile metal.

As shown in Fig. 4, with the washer 9 in place, the yoke 13 straddles yoke 11 and its clamping means are fastened about the protruding spindle end. When the cap follower 6 is drawn tightly against the face of body 2 compressing washer 9, it makes the entire blind bearing assembly pressure tight. The desirable amount of endplay of the spindle is adjustable by the position of the clamping means on the spindle. Due to the other end of the spindle going through to the atmosphere all thrust will be directed in that direction. Then upon such forward movement the spindles will carry with it the yoke 13 until it is stopped by bearing against nipple 12. Thereafter any forward motion of the spindle will be arrested by yoke 11, and nipple 12 thereon provides a bearing surface for yoke 13. With such arrangement as herein described, limited angular motion of the spindle may be transferred to the exterior of a pressure casing with a minimum amount of friction.

Thus I have illustrated and described a balanced, thrust taking assembly adapted for use in all pressure operated instruments. I have further eliminated a considerable amount of friction by avoiding a second open-bearing and in this wise created a more sensitive instrument. In view of my preferred disclosure I wish it to be understood that the same may be accomplished with other methods and other means and that I am to be limited only as to the claims in view of prior art.

What I claim as new, and desire to secure by Letters Patent of the United States, is:

1. A blind pressure-tight thrust bearing for one end of an angularly movable spindle comprising in combination, a spindle, a bearing housing for the spindle, said bearing housing having a flat outward surface, a combination washer and yoke assembly adapted to fit against the flat surface of the bearing housing and said yoke straddling the protruding spindle end, a second yoke having clamping means attached thereo, said second yoke straddling the first yoke and said clamping means fastening onto the protruding spindle end, and a cap maintaining the washer and yoke assembly in predetermined position against the flat surface of the bearing housing.

2. A blind pressure-tight thrust bearing for one end of an angularly movable spindle comprising in combination, a spindle, a bearing housing for the spindle, said bearing housing having a flat outward surface, a combination washer and yoke assembly adapted to fit against the flat surface of the bearing-housing and said yoke straddling the protruding spindle end, a second yoke having clamping means attached thereto, said second yoke straddling the first yoke and said clamping means fastening onto the protruding spindle end, an outwardly extending nipple on said first yoke acting as a bearing between the two yokes, and a cap for forcing the washer and yoke assembly against the flat surface of the bearing housing.

3. A blind pressure-tight thrust bearing for one end of an angularly movable spindle comprising in combination, a spindle, a bearing housing for the spindle, said bearing housing having a flat outward surface, a combination washer and yoke assembly adapted to fit against the flat surface of the bearing housing, aligning means for the washer and yoke assembly, rotation preventing means, a second yoke having clamping means attached thereto and straddling the first yoke, the clamping means fastening onto the protruding spindle end, an outwardly extending nipple on the first yoke providing a bearing between the two yokes, and a cap enclosing the assembly and forcing the washer and yoke against the flat surface of the bearing housing.

4. A blind pressure-tight thrust bearing for one end of an angularly movable spindle comprising in combination, a spindle, a bearing housing for the spindle, said bearing housing having a flat outward surface, a combination washer and yoke assembly adapted to fit against the flat surface of the bearing-housing and said yoke straddling the protruding spindle end, a second yoke having clamping means attached thereto, said second yoke straddling the first yoke and said clamping means fastening onto the protruding spindle end, an arcuate projection on one of said yokes forming a minimum bearing area for the other of said yokes, and a cap for forcing the washer and yoke assembly against the flat surface of the bearing housing.

5. A blind pressure-tight thrust bearing for one end of an angularly movable spindle comprising in combination, a spindle, a bearing housing for the spindle, said bearing housing having a flat outward surface, a combination washer and yoke assembly adapted to fit against the flat surface of the bearing housing and said yoke straddling the protruding spindle end, a second yoke having clamping means attached thereto, said second yoke straddling the first yoke and said clamping means fastening onto the protruding spindle end, an arcuate projection on one of said yokes providing a minimum bearing area for the other of said yokes, means for adjusting clearance between said yokes, and a cap for forcing the washer and yoke assembly against the flat surface of the bearing housing.

6. In a measuring apparatus, in combination, a pressure chamber, an angularly movable spindle within the chamber and having its ends extending through the walls of the chamber, one end of the spindle extending into the atmosphere through a pressure tight bearing, a blind pressure sealing cap for the opposite end of the spindle, and means within the blind cap providing a thrust bearing for the spindle comprising a part fastened to the spindle end and bearing against a pivot projecting from the wall of the chamber.

FREDERICK A. BARNES.